Oct. 30, 1928.
H. R. MAXON
1,689,352
SYSTEM FOR GATHERING GAS FROM OIL TANKS, ETC., OF REFINERIES
Filed May 19, 1926
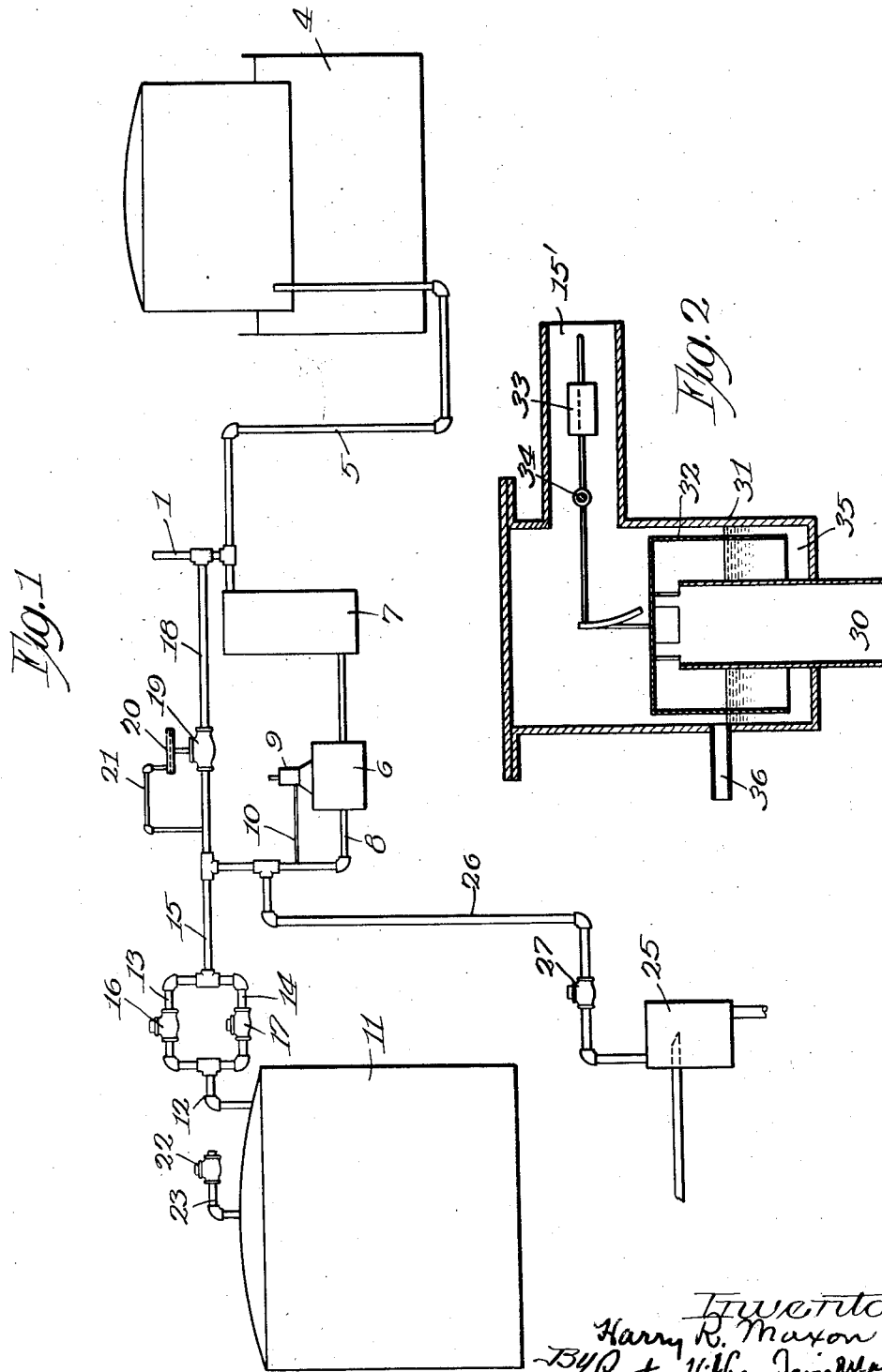

Patented Oct. 30, 1928.

1,689,352

UNITED STATES PATENT OFFICE.

HARRY R. MAXON, OF MUNCIE, INDIANA.

SYSTEM FOR GATHERING GAS FROM OIL TANKS, ETC., OF REFINERIES.

Application filed May 19, 1926. Serial No. 110,060.

It has long been common refinery practice to store oil intermediate various steps of its treatment and before and after such treatment in closed tanks provided with so-called breathing pipes. The provision of such pipes is for the purpose of preventing the collapse of the tank which might otherwise occur because of pressure differential between the interior and exterior thereof. For economic reasons the tanks are of comparatively light material and unadapted to resist considerable pressure. Unless communication with the atmosphere is maintained the withdrawal of the liquid contents of the tank or the lowering of the temperature of the gas above the oil would cause a subatmospheric pressure within the tank or, the heating of the tank due to atmospheric temperature changes or exposure to the rays of the sun would cause a super-atmospheric pressure within the tank either of which, if of sufficient magnitude, would cause destruction of or injury to the tank. With these tubes open to the atmosphere the tank "breathes" as it is called, expelling gas as the temperature rises and as the tank is filled, and drawing in air as the temperature falls or as the level of the oil in the tank is lowered by draft upon the contents thereof. It is well-known and has long been generally recognized that much of the oil so stored contains large quantities of dissolved gas and light hydrocarbons which are near their critical point at ordinary temperature and which, to a very large extent, escape and are lost through the breathing tubes. These gases and light hydrocarbons free from air dilution, have a high value for fuel and other purposes. In ordinary practice, however, even if saved they would be of reduced value because of irregular content of air because of the practice of opening a manhole in the cover of the tank for the purpose of thieving, gaging, inspection, etc.

It is the object of my invention to gather the gas in undiluted condition from the oil tank and other parts of the refinery apparatus from which such gas is available, and utilized for fuel or other purposes, it being entirely practical to pass such gas so gathered through an absorption or gasoline recovery plant and recover the condensible vapors in salable form, and at the same time insure the tank against dangerous pressure differentials.

In the drawing accompanying and forming a part of this specification, I have shown in Fig. 1 diagrammatically in elevation, a preferred embodiment of the invention, and Fig. 2 is a section of a modified detail.

In the system shown in the drawing, 1 indicates a pipe leading to some apparatus for the storage or use of gas. 4 is a gas-holder connected by a pipe 5 to pipe 1 for the purpose of maintaining a small substantially uniform pressure slightly above atmospheric on the latter. This pressure may well be in the neighborhood of two inches of water. 6 is a pump for feeding the gas to an absorber 7 and thence to the line 1. A slight pressure, preferably not more than two inches of water, may be maintained on the inlet side of the exhauster in the pipe 8. I have shown diagrammatically at 9 a pressure control governor for the exhauster, which may be of known or preferred form, connected at 10 to the pipe 8, whereby when the pressure in pipe 8 becomes excessive the pump is set in motion to force gas to the absorber and to the pipe 1 and gas holder 4. 11 is a closed tank such as commonly employed for storing oil in refineries, but having no breathing pipe in the top thereof. A pipe 12 leads from the top of said tank to two branch pipes 13, 14 which are brought together and connected by pipe 15 with the inlet pipe 8 of the pump and to the by-pass 18 hereinafter described. Pipe 13 is provided with a check-valve 16 which may be of ordinary form opening away from the tank so that when the pressure in the tank exceeds that in the pipe 15 the valve will open and permit gas to flow from the tank 11 to the inlet of the exhauster. Pipe 14 is provided with a check valve opening in the opposite direction, but so weighted that it will remain closed with the normal pressure in the pipe 15 and a pressure in tank 11 which is substantially atmospheric or higher. In other words, the valve 17 remains closed under normal conditions. But if the pressure in the tank 11 falls substantially below atmospheric, due to the withdrawal of oil or a sudden drop in temperature, valve 17 will open, permitting the gas to flow back from the gathering line into the tank 11 through by-pass 18. This by-pass consists of a pipe having a valve 19 controlled by a pressure governor 20 which may be of usual or preferred form connected to the by-pass 18 by a pipe 21 so as to be controlled by the pressure in pipe 15. The pressure regulator is so designed that on the drop of pressure in pipe 15 following a pressure drop in tank 11 below the normal, valve 19 will open and permit the gas to flow from the gathering line through the by-pass into pipe 15 and then a through pipe 14 and valve 17 into tank 11. Tank 11 is provided with an emergency air inlet valve 22 connected thereto by pipe 23, said valve 22 being so weighted as to open only when the air pressure in tank 11 falls to such a point as to endanger the structure. Any normal reduction in pressure in the tank 11, however, will be taken care of by gas returning through the by-pass and valve 17.

In operation, as heretofore indicated, a pressure slightly above atmospheric, say of about two inches of water is maintained on the system including pipe 15 by gas holder 4 and when the pressure in the tank 11, due to the development of gas from the oil therein exceeds that pressure, gas will flow through pipe 12, valve 16, pipe 13 to the pipe 15 and the increased pressure operating on the governor 9 will set the pump 6 into operation to transfer gas to the absorber and to the gathering and distributor pipe 1. If the pressure in the tank 11 is intermediate atmospheric and the pressure in the pipe 15 there will be no flow of gas in either direction. When the pressure in tank 11 is below atmospheric gas will flow to said tank through the by-pass and valve 17 as above described to relieve this condition. In the unusual circumstance that the flow through the valve 17 is not sufficient to restore the pressure in tank 11, valve 22 will open to admit atmospheric air and restore the balance of pressure. Obviously, if a man-hole in the tank is open for "thieving", gaging, inspection, etc, or other purpose, there will be no flow of gas from the tank to the gathering line.

Thus by my system the gas given off by the tank is saved and used and is kept sufficiently free from air because of the pressure maintained on the system to maintain its value as a fuel. At the same time the tank is saved from collapse which might otherwise occur due to excess or reduced pressure therein.

I have shown only one tank connected to the gathering line, but manifestly any number of tanks could be so connected.

Gas may also be supplied to the gathering line from other sources within the refinery and I have shown at 25 a look box such as is commonly located in the run down line from a still condenser, connected by pipe 26 to the intake part of the pump. A check valve 27 in the line 26 prevents the back flow of gas in case the pressure in the look box is less than that at the inlet side of the pump.

Manifestly if desired, the pump or absorber, or either of them, may be omitted from the connection.

Instead of the valves 16 and 17, a liquid seal may be employed. Figure 2 shows such a liquid seal. In the illustration a riser 30 extending through the bottom of a casing 31 may be connected to the gas space of tank 11. A bell 32 is suspended in the usual manner from a weighted lever 33 pivoted at 34. From the casing a pipe 15' leads to the gathering pipe. As liquid seal is provided at 35 and a skimmer pipe at 36 which leads off gasoline which may condense and float upon the liquid of the seal 35. Preferably glycerin or a strong solution thereof is used to constitute the seal. It will be noted that the area of the surface of the liquid within the bell 32 is considerably greater than that between the bell and the wall of the casing. The volume of the liquid within the bell and above the lower edge thereof is correspondingly greater than the volume of the liquid above the bottom of the bell and between said bell and the wall of the casing when the level of the liquid is the same within and without the valve. Thus the seal performs the combined functions of the valves 16 and 17, permitting flow of gas to the tank 11 under a slight reduction of normal pressure and permitting flow of gas from the tank 11 on a somewhat greater increase of normal pressure, depending on the ratio of the areas referred to above. Thus by properly designing the seal, the excess pressure required to return gas to the tank 11 over that required to permit the flow of gas past the seal from the tank 11 to the gathering line may be predetermined as required.

This makes the valve more sensitive to a vacuum since for every inch the liquid level inside the bell is raised by a vacuum in the oil storage tank, the liquid level outside the bell would be lowered an amount in proportion to the ratio of the inside area to the outside area, thus causing the breaking of the seal sooner.

Since the seal does not have any part in the operation of the valve, during the flow of gas from the oil storage tank to the gathering lines, the force of the gas merely lifting the bell clear of the liquid, it follows that gas can flow from the tank to the line 15' with a lower pressure differential than in the reverse direction. By properly weighting the lever 34 a sufficient resistance to the flow of gas to the tank may be created to prevent such flow unless the pressure in the tank falls below atmospheric.

I claim:

1. In a system of the class described, a gathering line, means for maintaining a slight superatmospheric pressure on the gathering line, a closed tank for containing oil, and connections between the line and tank including means permitting the passage of gas from the tank to the gathering line and means for permitting the passage of gas from the gathering line to the tank when the pressure in the tank drops below atmospheric but preventing such passage as long as atmospheric pressure is maintained in the tank.

2. In a system of the class described, a tank, a gathering line, means for maintaining a substantially uniform pressure on the gathering line, and means permitting the supply of gas from the tank to the gathering line when the pressure in the tank exceeds that in the gathering line by predetermined amount and permitting the return of gas to the tank from the gathering line when the pressure on the latter exceeds that on the tank by substantially larger predetermined amounts.

In testimony whereof, I have subscribed my name.

HARRY R. MAXON.